(12) United States Patent
Takahashi (10) Patent No.: US 9,930,204 B2
(45) Date of Patent: Mar. 27, 2018

(54) IMAGE READING APPARATUS (71) Applicant: CANON KABUSHIKI KAISHA, Tokyo (JP)

(72) Inventor: Toshio Takahashi, Toda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/058,982

(22) Filed: Mar. 2, 2016

(65) Prior Publication Data
US 2016/0269582 A1 Sep. 15, 2016

(30) Foreign Application Priority Data
Mar. 12, 2015 (JP) ................................ 2015-049272

(51) Int. Cl.
*H04N 1/04* (2006.01)
*H04N 1/028* (2006.01)

(52) U.S. Cl.
CPC ....... *H04N 1/0289* (2013.01); *H04N 1/02855* (2013.01); *H04N 1/02885* (2013.01)

(58) Field of Classification Search
CPC ............. H04N 1/0289; H04N 1/02855; H04N 1/02885
USPC .................. 358/475, 484, 509, 482
See application file for complete search history.

(56) References Cited

U.S. PATENT DOCUMENTS

| 4,519,686 A * | 5/1985 | Seki ........................ G03B 13/24 |
| | | 359/454 |
| 5,926,286 A * | 7/1999 | Fujieda .............. H04N 1/02815 |
| | | 358/474 |
| 6,631,014 B1 | 10/2003 | Aoshima et al. ............. 358/497 |
| 6,717,702 B1 | 4/2004 | Yamauchi et al. ............ 358/497 |
| 7,538,911 B2 * | 5/2009 | Sakurai .............. H04N 1/02815 |
| | | 358/474 |
| 7,692,827 B2 | 4/2010 | Sugiyama et al. ............ 358/497 |
| 7,717,598 B2 * | 5/2010 | Kakizaki .............. G02B 6/0018 |
| | | 250/227.11 |

(Continued)

FOREIGN PATENT DOCUMENTS

| EP | 2 299 300 | 3/2011 |
| JP | H08-18729 | 1/1996 |

OTHER PUBLICATIONS

GB Search Report dated Jul. 19, 2016 in counterpart GB Application No. GB1603684.0.

*Primary Examiner* — Cheukfan Lee
(74) *Attorney, Agent, or Firm* — Fitzpatrick, Cella, Harper & Scinto (57) ABSTRACT

An image reading apparatus including: an illumination device configured to illuminate an original; and a solid-state image sensor configured to receive and convert a reflected light from the original into an image signal, wherein the illumination device includes: a plurality of light emitting elements; and a light guide configured to guide light emitted from the light emitting elements toward the original, wherein the light guide includes: a deflection surface configured to deflect the light emitted from the light emitting elements to direct the light toward the original; and an emission surface configured to emit the light deflected by the deflection surface toward the original, wherein the deflection surface has a plurality of first curved optical surfaces provided side by side in a longitudinal direction of the light guide, and wherein the emission surface has a plurality of second curved optical surfaces provided side by side in the longitudinal direction.

13 Claims, 7 Drawing Sheets

(56) References Cited

U.S. PATENT DOCUMENTS

| | | | | |
|---|---|---|---|---|
| 7,742,203 B2 | 6/2010 | Sugiyama et al. | | 358/497 |
| 7,760,434 B2* | 7/2010 | Wilsher | | H04N 1/02815 359/619 |
| 7,855,815 B2* | 12/2010 | Hayashide | | H04N 1/02815 250/208.1 |
| 7,973,983 B2* | 7/2011 | Lin | | F21V 5/00 358/475 |
| 7,995,252 B2* | 8/2011 | Okamoto | | H04N 1/02815 358/474 |
| 8,228,567 B2* | 7/2012 | Kim | | H04N 1/02835 358/474 |
| 8,837,009 B2* | 9/2014 | Kawasaki | | G02B 5/0215 345/690 |
| 8,867,109 B2* | 10/2014 | Mitsutake | | H04N 1/02855 358/474 |
| 8,876,355 B2* | 11/2014 | Nomoto | | G02B 6/002 358/475 |
| 2006/0165370 A1* | 7/2006 | Nemoto | | G02B 6/0038 385/146 |
| 2007/0242475 A1* | 10/2007 | Minobe | | G02B 5/021 362/608 |
| 2012/0275188 A1* | 11/2012 | Kurimoto | | G02B 6/0038 362/608 |
| 2013/0070312 A1* | 3/2013 | Saiga | | H04N 1/02855 358/474 |
| 2013/0114293 A1* | 5/2013 | Morino | | G02B 6/002 362/608 |
| 2013/0222866 A1* | 8/2013 | Sugiyama | | H04N 1/0285 358/497 |
| 2014/0211506 A1* | 7/2014 | Nakagome | | G02B 6/0036 362/613 |
| 2014/0355296 A1 | 12/2014 | Shigoku | | G02B 6/0096 |

* cited by examiner

IMAGE READING APPARATUS

BACKGROUND OF THE INVENTION

Field of the Invention

The present invention relates to an image reading apparatus including an illumination device configured to illuminate an original.

Description of the Related Art

Hitherto, an image reading apparatus has been used in a copying machine, an image scanner, a multifunction printer, and the like. The image reading apparatus is configured to read an image of an original by illuminating the original with light and receiving light reflected from the original. The image reading apparatus includes an illumination device configured to illuminate an original with light. There is known an illumination device including a light guide configured to guide light emitted from a plurality of light emitting elements to an original (U.S. Pat. No. 8,876,355).

Figure 8A:
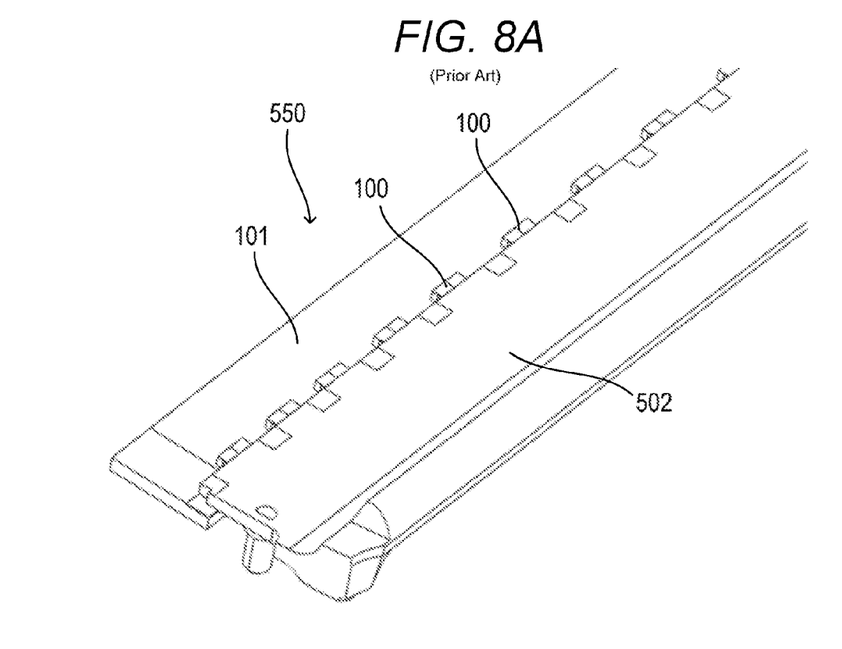
FIG. 8A and FIG. 8B are views for illustrating a conventional illumination device.
Figure 8B:
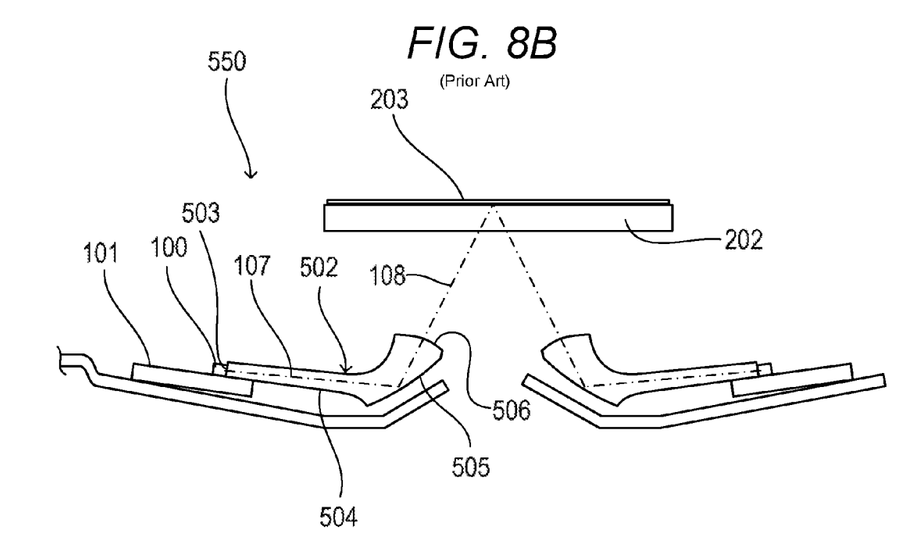

FIG. 8A and FIG. 8B are views for illustrating a conventional illumination device 550. FIG. 8A is a perspective view of the illumination device 550. FIG. 8B is a cross-sectional view for illustrating a sub-scanning cross-section of the illumination device 550. The illumination device 550 includes a plurality of light emitting elements 100, a circuit board 101 on which the plurality of light emitting elements 100 are arrayed, and a light guide 502 fixed to the circuit board 101. A light beam 107 emitted from each of the plurality of light emitting elements 100 enters an incident surface 503 of the light guide 502. The light beam 107 propagates while repeating total reflection on an inner wall of a light guide portion 504 of the light guide 502. The light beam 107 is deflected by a deflection surface 505 toward an upward travelling direction and emitted from an emission surface 506 as an emission light beam 108. A surface of an original 203 placed on a platen glass 202 is linearly illuminated with the emission light beam 108.

Figure 9A:
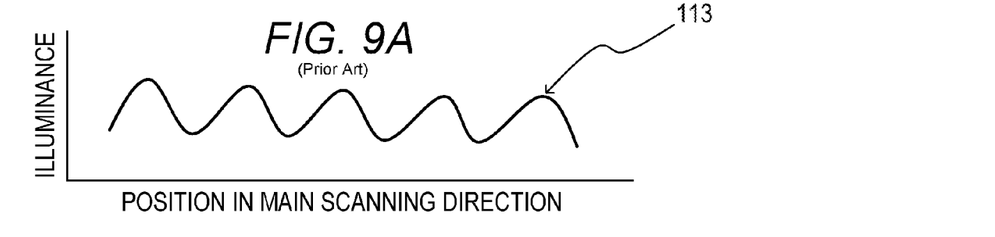
FIG. 9A and FIG. 9B are views for illustrating light distribution characteristics of the conventional illumination device.
Figure 9B:
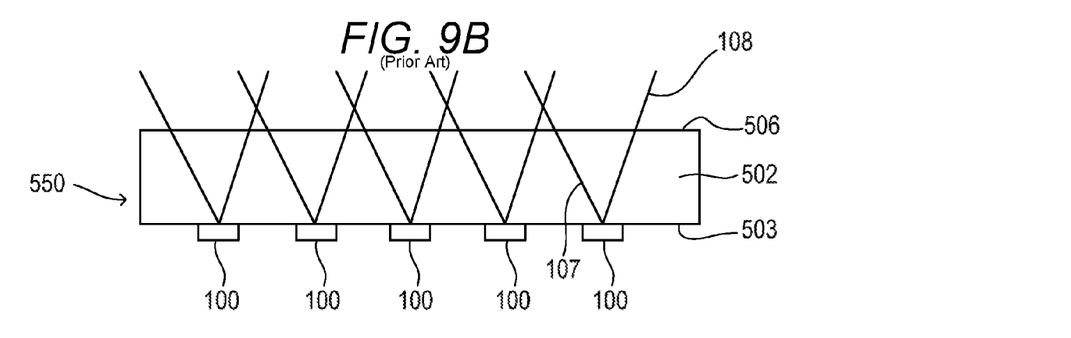

As illustrated in FIG. 8A, the plurality of light emitting elements 100 are linearly arranged on the circuit board 101 at predetermined intervals (distances). FIG. 9A and FIG. 9B are views for illustrating light distribution characteristics of the conventional illumination device 550. FIG. 9A is a graph for showing an illuminance on the original 203 at positions in a main scanning direction. FIG. 9B is a light beam distribution diagram of the conventional light guide 502. The plurality of light emitting elements 100 are arranged so as to be spaced apart from each other, and hence uneven illuminance 113 (hereinafter referred to as "unevenness due to light emitting points") occurs in the illuminance distribution on the original surface depending on the array intervals of the plurality of light emitting elements 100.

Figure 10A:
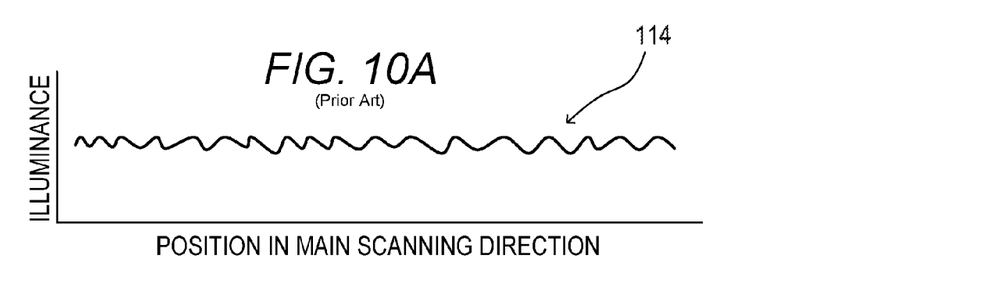
FIG. 10A and FIG. 10B are views for illustrating light distribution characteristics of an illumination device including a toric surface array provided on an emission surface.
Figure 10B:
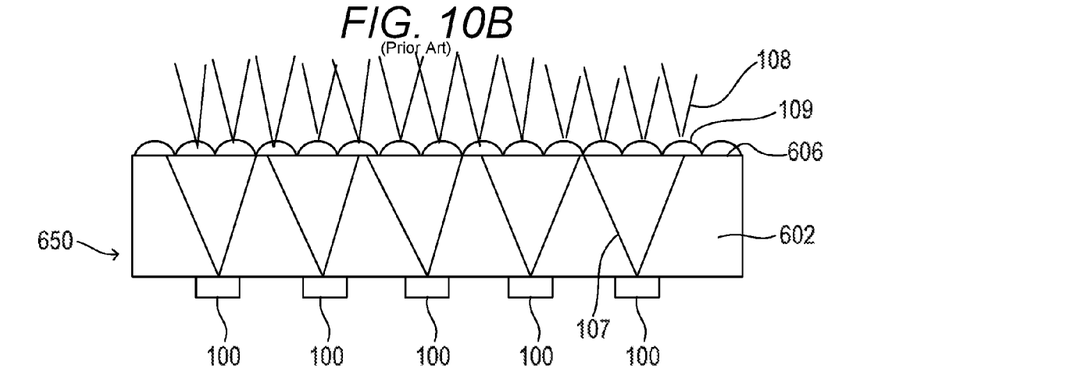

In order to reduce the unevenness 113 due to light emitting points, it is conceivable to form a toric surface array 109 on an emission surface 606 of a light guide 602. FIG. 10A and FIG. 10B are views for illustrating light distribution characteristics of an illumination device 650 including the toric surface array 109 formed on the emission surface 606. The toric surface array 109 comprises a plurality of toric surfaces arrayed side by side in a longitudinal direction of the light guide 602. The toric surface array 109 serves as a secondary light source configured to diffuse the emission light beam 108 emitted from the emission surface 606 in the longitudinal direction of the light guide 602. The toric surface array 109 is configured to reduce the unevenness 113 due to light emitting points as shown in FIG. 9A. However, as shown in FIG. 10A, fine uneven illuminance 114 (hereinafter referred to as "unevenness due to pitch bright points") occurs depending on the pitch of the plurality of toric surfaces of the toric surface array 109. In particular, there is a problem in that, when reading a glossy original, the unevenness 114 due to pitch bright points occurs on a read image.

SUMMARY OF THE INVENTION

In view of the above, the present invention provides an image reading apparatus configured to reduce uneven illuminance on an original surface illuminated by an illumination device so as to read an image.

In order to solve the above-mentioned problem, according to one embodiment of the present invention, there is provided an image reading apparatus configured to read an image of an original, the image reading apparatus comprising:
an illumination device configured to illuminate the original; and
a solid-state image sensor configured to receive a reflected light from the original and convert the reflected light into an image signal,
wherein the illumination device includes:
a plurality of light emitting elements; and
a light guide configured to guide light emitted from the plurality of light emitting elements toward the original,
wherein the light guide includes:
a deflection surface configured to deflect the light emitted from the plurality of light emitting elements to direct the light toward the original; and
an emission surface configured to emit the light deflected by the deflection surface toward the original,
wherein the deflection surface has a plurality of first curved optical surfaces provided side by side in a longitudinal direction of the light guide, and
wherein the emission surface has a plurality of second curved optical surfaces provided side by side in the longitudinal direction of the light guide.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

First Embodiment

Figure 5:
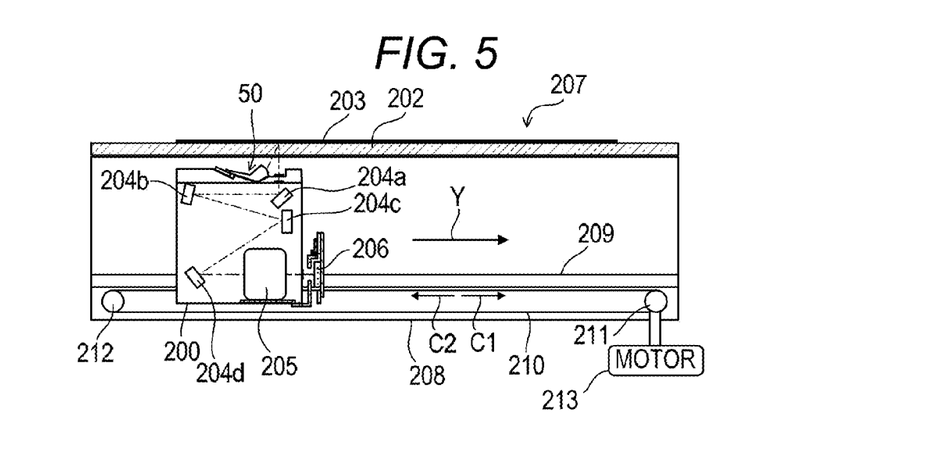
FIG. 5 is a cross-sectional view of an image reading apparatus according to the first embodiment.

A first embodiment will be described below.
(Image Reading Apparatus)
FIG. 5 is a cross-sectional view of an image reading apparatus 207 according to the first embodiment. The image reading apparatus 207 includes a main body 208, a platen glass 202 arranged on an upper portion of the main body 208, and an optical unit 200 movable in a sub-scanning direction Y inside the main body 208. The optical unit 200 is supported by a track 209 formed in the main body 208. The optical unit 200 is fixed to a belt 210 looped around a pair of pulleys 211 and 212. A motor 213 causes the pulley 211 to rotate forward and backward, to thereby rotate the belt 210 in directions indicated by the arrows C1 and C2. When the belt 210 is rotated forward by the motor 213 in the direction indicated by the arrow C1, the optical unit 200 moves along the track 209 in the sub-scanning direction Y. On the other hand, when the belt 210 is rotated backward by the motor 213 in the direction indicated by the arrow C2, the optical unit 200 moves in a direction opposite to the sub-scanning direction Y.

The optical unit 200 is configured to read an image of an original 203 while moving in the sub-scanning direction Y under the platen glass 202 on which the original 203 is placed. The sub-scanning direction Y is orthogonal to a main scanning direction X (FIG. 1B). The main scanning direction X is a direction in which a plurality of light receiving portions in a solid-state image sensor (an image sensor) 206 of the optical unit 200 are arrayed (a direction perpendicular to the drawing sheet of FIG. 5). In other words, the solid-state image sensor 206 is configured to convert an image of the original 203 into image signals linearly in the main scanning direction X.

Figure 4:
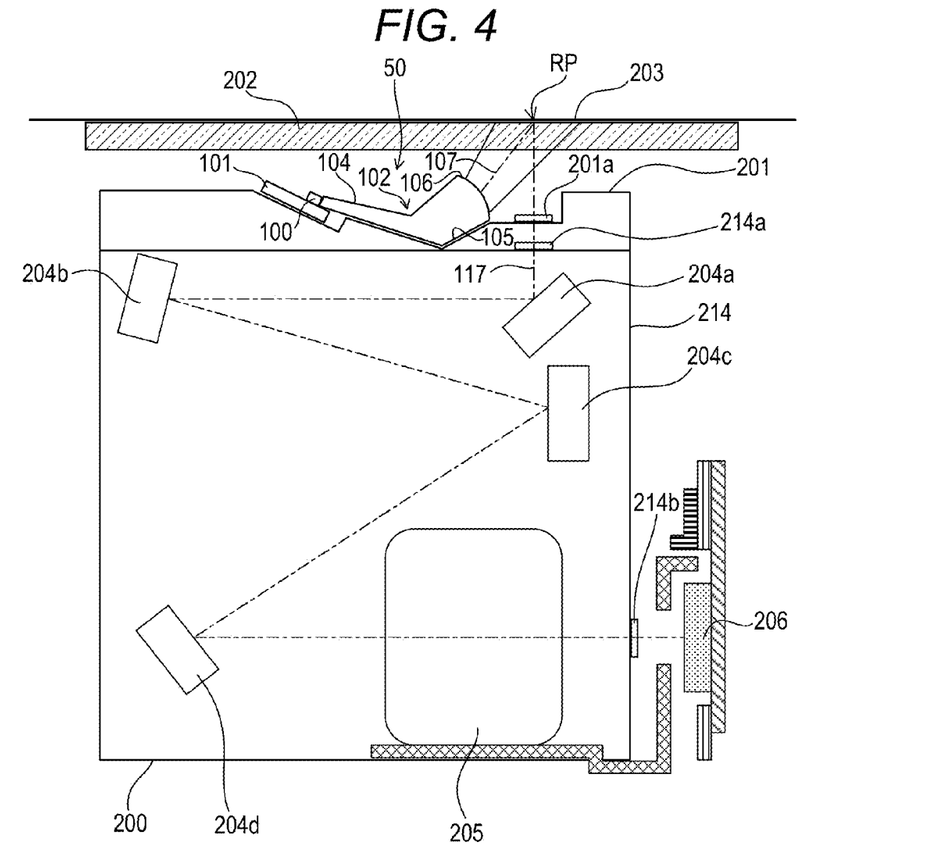
FIG. 4 is a cross-sectional view of an optical unit according to the first embodiment.

(Optical Unit)
FIG. 4 is a cross-sectional view of the optical unit 200 according to the first embodiment. The optical unit 200 includes a frame 214, an illumination device (illumination unit) 50, reflection mirrors 204 (204a, 204b, 204c, and 204d), a lens unit (imaging optical system) 205, and the solid-state image sensor 206. A housing member 201 is arranged on an upper portion of the frame 214. The illumination device 50 is fixed to the housing member 201. The plurality of reflection mirrors 204 and the lens unit 205 are arranged in the frame 214. The solid-state image sensor 206 is fixed to a lateral portion of the frame 214.

The illumination device 50 is configured to linearly illuminate the original 203 on the platen glass 202 in the main scanning direction X. An LED beam (hereinafter referred to as "light beam") 107 emitted from the illumination device 50 is reflected by the original 203 on the platen glass 202. A reflected light beam 117 passes through a light transmitting portion 201a of the housing member 201 and a light transmitting portion 214a of the frame 214 to enter the interior of the frame 214. The reflected light beam 117 is reflected by the reflection mirrors 204a, 204b, 204c, and 204d to enter the lens unit 205. The lens unit 205 causes the reflected light beam 117 to pass through a light transmitting portion 214b of the frame 214 to be imaged on the solid-state image sensor 206. The solid-state image sensor 206 has the plurality of light receiving portions arrayed in the main scanning direction X. The solid-state image sensor 206 is configured to receive the reflected light beam 117 and photoelectrically convert the received reflected light beam 117 into electric signals as image signals based on linear image information of the original 203 in the main scanning direction X.

The optical unit 200 is configured to read a planar image of the original 203 by sequentially outputting the linear image information in the main scanning direction X as electric signals while moving in the sub-scanning direction Y in the image reading apparatus 207.

Figure 1A:
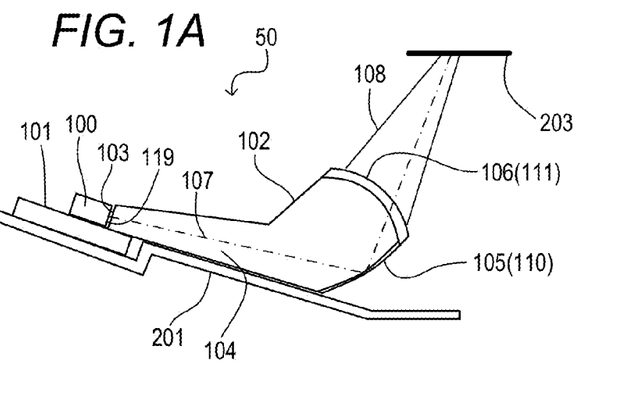
FIG. 1A, FIG. 1B, and FIG. 1C are views for illustrating an illumination device according to a first embodiment.
Figure 1B:
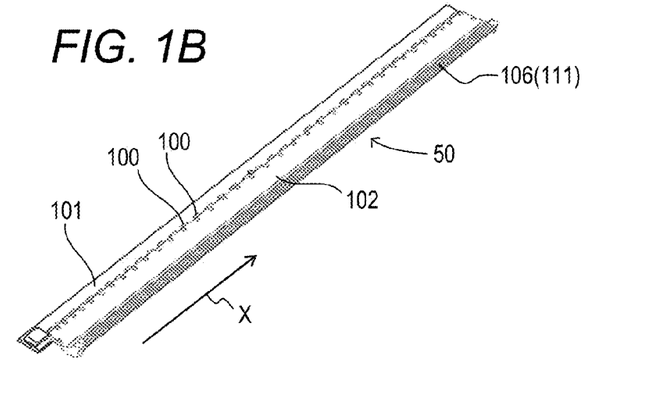

(Illumination Device)
FIG. 1A, FIG. 1B, and FIG. 1C are views for illustrating the illumination device 50 according to the first embodiment. FIG. 1A is a cross-sectional view for illustrating a sub-scanning cross-section of the illumination device 50. FIG. 1B is a perspective view of the illumination device 50. The illumination device 50 includes a plurality of light emitting diodes (hereinafter referred to as "light emitting elements") 100, an LED printed circuit board (hereinafter referred to as "circuit board") 101 on which the plurality of light emitting elements 100 are arrayed, and a light guide 102 fixed to the circuit board 101. According to the embodiment, edge-emitting light emitting diodes are used as the light emitting elements 100. However, surface-emitting light emitting diodes may be used as the light emitting elements 100. The plurality of light emitting elements 100 are arranged in a linear array at predetermined intervals along a longitudinal direction (hereinafter referred to as the main scanning direction X) of the circuit board 101.

The light guide 102 includes an incident surface 103, a light guide portion 104, a deflection surface (reflection surface) 105, and an emission surface 106. According to the embodiment, the light guide 102 is formed of a transparent resin material such as an acrylic resin. The light guide 102 is fixed to the circuit board 101. The circuit board 101 is mounted to the housing member 201 of the optical unit 200. The light guide 102 has a shape elongated in the main scanning direction X. The incident surface 103 of the light guide 102 is arranged along the plurality of linearly arranged light emitting elements 100. The incident surface 103 is arranged in proximity to light emitting portions (emission surfaces) 119 of the light emitting elements 100 to reduce light intensity loss of light from the light emitting elements 100.

The light beam 107 emitted from each of the light emitting portions 119 of the light emitting elements 100 enters the incident surface 103 of the light guide 102. The light beam 107 having entered the incident surface 103 propagates while repeating total reflection in the interior of the light guide portion 104 of the light guide 102. The deflection surface 105 configured to direct the light beam 107 toward the original 203 is formed between the light guide portion 104 and the emission surface 106 of the light guide 102. The deflection surface 105 is configured to deflect (reflect) the light beam 107 obliquely upward as illustrated in FIG. 1A. The deflected light beam 107 is emitted from the emission surface 106 of the light guide 102 as an emission light beam 108. The surface of the original 203 is linearly illuminated with the emission light beam 108 in the main scanning direction X.

Figure 1C:
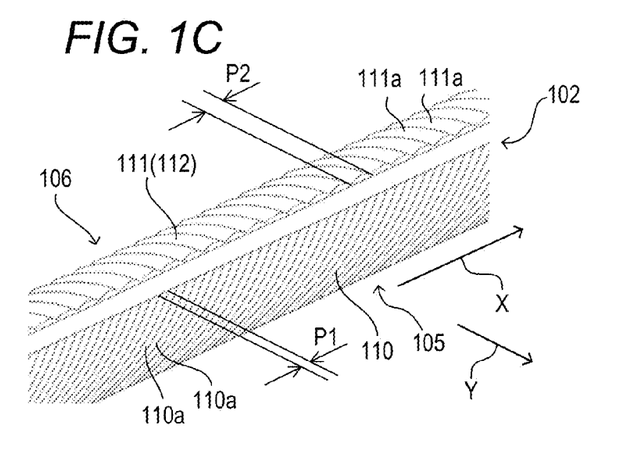

(Light Guide)
FIG. 1C is a partially enlarged view of the deflection surface 105 and the emission surface 106 of the light guide 102. A plurality of curved optical surfaces 110a and 111a are formed on the deflection surface 105 and the emission surface 106 side by side in the longitudinal direction of the light guide 102 (main scanning direction X). According to the first embodiment, the curved optical surfaces 110a and 111a are convex toric surfaces. The convex toric surfaces 110a and 111a have power in the longitudinal direction (main scanning direction X) of the light guide 102 and the direction (sub-scanning direction Y) orthogonal to the longitudinal direction X. However, the convex toric surfaces 110a and 111a may not necessarily have power in the longitudinal direction X of the light guide 102 and the sub-scanning direction Y orthogonal to the longitudinal direction X. The convex toric surfaces 110a and 111a may have power in a direction inclined with respect to the longitudinal direction X and power in a direction inclined with respect to the sub-scanning direction Y orthogonal to the longitudinal direction X. In other words, the longitudinal direction of each of the convex toric surfaces 110a and 111a may be a direction perpendicular to the longitudinal direction X of the light guide 102 or be inclined with respect to the longitudinal direction X of the light guide 102. Further, each of the convex toric surfaces 110a and 111a may be linearly formed in the longitudinal direction of each of the convex toric surfaces 110a and 111a or be formed so as to be curved in the longitudinal direction of each of the convex toric surfaces 110a and 111a.

On the deflection surface 105 of the light guide 102, there is formed a first toric surface array (first curved optical surface array) 110 in which the plurality of convex toric surfaces (first curved optical surfaces) 110a are arranged side by side at equal intervals at a first pitch (first distance) P1 in the longitudinal direction X of the light guide 102. The first pitch P1 corresponds to a width of the convex toric surface 110a. According to the embodiment, the plurality of convex toric surfaces 110a are formed side by side without gaps between the adjacent convex toric surfaces 110a. However, slight gaps (non-toric surface) may exist between the adjacent convex toric surfaces 110a. The first toric surface array 110 serves as a secondary light source configured to deflect the light beam 107 propagating in the light guide portion 104 upward and to diffuse the light beam 107 in the longitudinal direction X of the light guide 102. The first toric surface array 110 converts the light beam 107 into a diffused light beam in the longitudinal direction X of the light guide 102, thus reducing unevenness due to light emitting points that may occur depending on the array intervals of the light emitting elements 100.

On the emission surface 106 of the light guide 102, there is formed a second toric surface array (second curved optical surface array) 111 in which the plurality of convex toric surfaces (second curved optical surfaces) 111a are arranged side by side at equal intervals at a second pitch (second distance) P2 in the longitudinal direction X of the light guide 102. The second pitch P2 corresponds to a width of the convex toric surface 111a. According to the embodiment, the plurality of convex toric surfaces 111a are formed side by side without gaps between the adjacent convex toric surfaces 111a. The second toric surface array 111 serves as a secondary light source configured to diffuse the emission light beam 108, which is emitted from the emission surface 106 of the light guide 102, in the longitudinal direction X of the light guide 102. The second toric surface array 111 converts the emission light beam 108 into a diffused light beam in the longitudinal direction X of the light guide 102, thus further reducing the unevenness due to light emitting points that may occur depending on the array intervals of the light emitting elements 100.

The emission surface 106 on which the second toric surface array 111 is formed has an optical diffusion structure (processing) 112 configured to further diffuse the emission light beam 108 by scattering the light beam 107 passing therethrough. According to the embodiment, the optical diffusion structure 112 includes a texture (wrinkle pattern) such as grain formed on the plurality of convex toric surfaces. The texture is a fine concavity-and-convexity pattern. A fine pattern as the optical diffusion structure 112 may be formed by irregular micromachining on the plurality of convex toric surfaces 111a. The optical diffusion structure 112 formed on the second toric surface array 111 reduces unevenness due to pitch bright points that may occur depending on the second pitch P2 of the plurality of convex toric surfaces 111a of the second toric surface array 111.

(Surface Texturing)

Figure 2A:
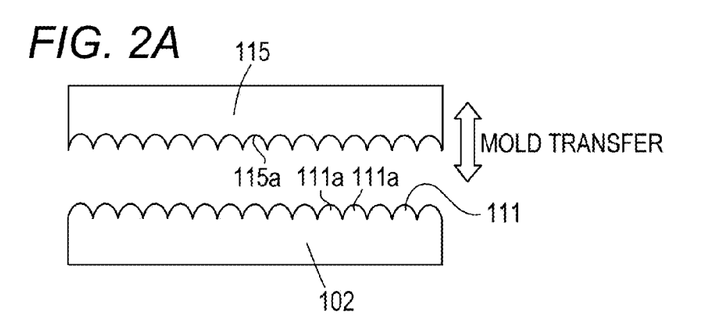
FIG. 2A and FIG. 2B are explanatory views of surface texturing.
Figure 2B:
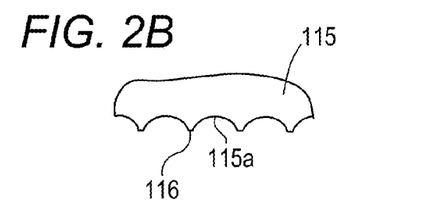

FIG. 2A and FIG. 2B are explanatory views of surface texturing. FIG. 2A is an explanatory view of how a texture of a surface 115a of a mold 115 is transferred to the second toric surface array 111 of the light guide 102. The surface texturing is performed by forming a fine concavity-and-convexity pattern on the surface 115a of the mold 115 and transferring the formed pattern to the second toric surface array 111. The fine concavity-and-convexity pattern is formed on the surface 115a of the mold 115 by etching or sandblasting.

FIG. 2B is a partially enlarged view of the surface 115a of the mold 115. Fine concavities and fine convexities are formed on the surface 115a of the mold 115a by sandblasting. The sandblasting causes chipping to proceed at edge portions 116 of the mold 115 configured to form the second toric surface array 111 more than at the other portions. Considerable chipping at the edge portions 116 may cause unevenness in the shape of the toric surfaces 111a or hinder formation of the toric surfaces 111a. Unevenness or distortion in the shape of the plurality of toric surfaces 111a of the second toric surface array 111 reduces the effect of diffusing the emission light beam 108. On the other hand, when the sandblasting is performed using not coarse sand grains but fine sand grains in order to reduce the chipping at the edge portions 116 of the mold 115, coarse surface texturing cannot be performed on the surface 115a of the mold 115. When the coarse surface texturing cannot be performed on the surface 115a of the mold 115, a coarse texture cannot be transferred to the second toric surface array 111, with the result that the unevenness due to pitch bright points cannot be effectively reduced.

Incidentally, the unevenness due to light emitting points can be reduced by increasing the number of the toric surfaces 111a of the second toric surface array 111. However, an increase in the number of the toric surfaces 111a leads to an increase in the number of the edge portions 116 of the mold 115 as well. Therefore, the number of the edge portions 116 that may be chipped off by surface texturing is increased, thus causing a problem in that reduction in the unevenness due to pitch bright points by surface texturing of the second toric surface array 111 cannot be expected when the number of the toric surfaces 111a is increased.

Then, according to the embodiment, as illustrated in FIG. 1C, the second pitch P2 of the plurality of toric surfaces 111a of the second toric surface array 111 is set to be larger than the first pitch P1 of the toric surfaces 110a of the first toric surface array 110 (P1<P2). The number of peaks and troughs of the mold 115 configured to form the second toric surface array 111, namely, the number of the edge portions 116 can be thus reduced. Reduction in the number of the edge portions 116 lowers the effect of the chipping at the edge portions 116 on the shape of the individual toric surfaces 111a. Therefore, the sandblasting is performed using the coarse sand grains to allow the coarse surface texturing to be performed on to the surface 115a of the mold 115. Hitherto, the surface 115a of the mold 115 has been subjected to only shallow surface texturing at the level of honing No. 3 of Nihon Etching Co., Ltd., but according to the embodiment, coarse surface texturing at the level of honing No. 8 can be performed.

Figure 3A:
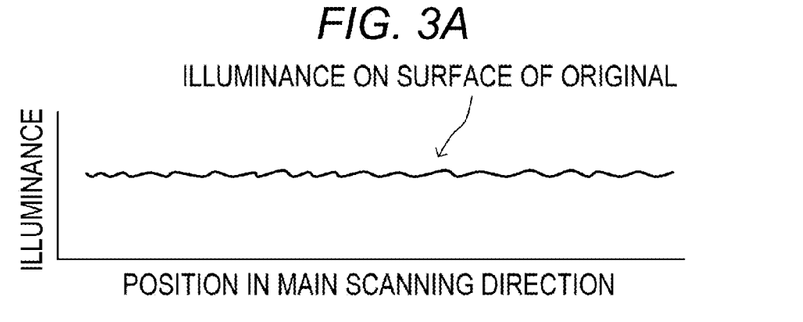
FIG. 3A and FIG. 3B are views for illustrating light distribution characteristics according to the first embodiment.
Figure 3B:
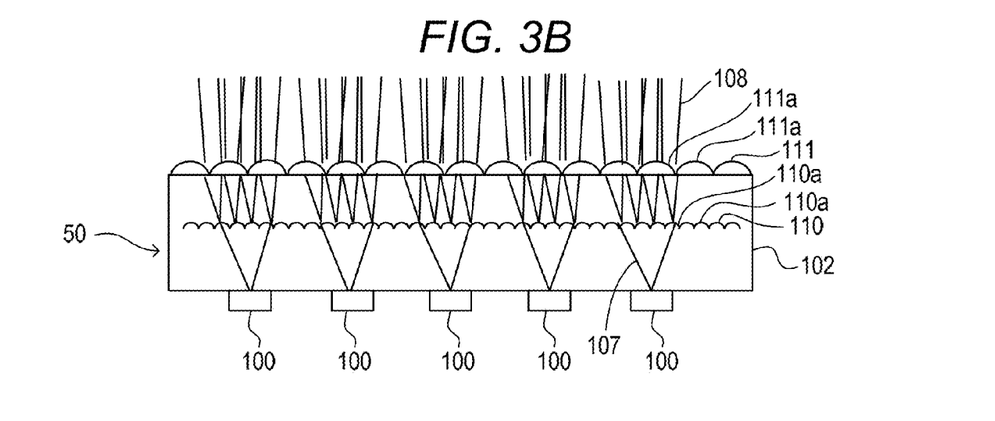

FIG. 3A and FIG. 3B are views for illustrating light distribution characteristics according to the first embodiment. FIG. 3A is a graph for showing the illuminance on the original 203 at positions in the main scanning direction X. FIG. 3B is a light beam distribution diagram of the light guide 102 according to the first embodiment. It is understood from FIG. 3A that the light guide 102 according to the first embodiment achieves a more uniform illuminance distribution (illumination light intensity distribution) on the surface of the original 203 than in the conventional art, thus reducing uneven illuminance.

According to the embodiment, the second pitch P2 of the second toric surface array 111 having the optical diffusion structure 112 is set to be larger than the first pitch P1 of the first toric surface array 110. Therefore, the number of peaks and troughs of the mold 115 configured to form the second toric surface array 111 can be reduced. Even when the chipping occurs at the edge portions (peak portions) 116 of the mold 115, the ratio of the area that may be affected by the chipping at the edge portions 116 is reduced in the profile of the individual toric surfaces 111a. Therefore, the effect of the deformation of the profile of the toric surfaces 111a due to the chipping at the edge portions 116 on the evenness of illumination light can be reduced. Further, the unevenness due to light emitting points that may be caused by the plurality of light emitting elements 100 arranged discretely can be reduced by the two toric surface arrays 110 and 111. Therefore, according to the embodiment, the unevenness due to light emitting points that may be caused by the plurality of light emitting elements 100 and the unevenness due to pitch bright points that may be caused by the plurality of toric surfaces 110a and 111a can be effectively reduced, thereby being capable of reducing the uneven illuminance on the surface of the original 203.

According to the embodiment, the second toric surface array 111 is subjected to the surface texturing. However, the second toric surface array 111 may not have the optical diffusion structure 112 through the surface texturing. Also in this case, the uneven illuminance can be reduced by the two toric surface arrays 110 and 111.

According to the embodiment, the second pitch P2 of the plurality of toric surfaces 111a of the second toric surface array 111 is set to be larger than the first pitch P1 of the plurality of toric surfaces 110a of the first toric surface array 110 (P1<P2). However, when the second pitch P2 is set to a value suitable for the surface texturing, the first pitch P1 may be equal to the second pitch P2.

Second Embodiment

Next, a second embodiment will be described. In the second embodiment, the same components as those of the first embodiment are denoted by the same reference symbols and their description is omitted. An image reading apparatus, an optical unit, and an illumination device according to the second embodiment are the same as those according to the first embodiment and their description is omitted. A light guide according to the second embodiment will be described below.

(Light Guide)

Figure 6A:
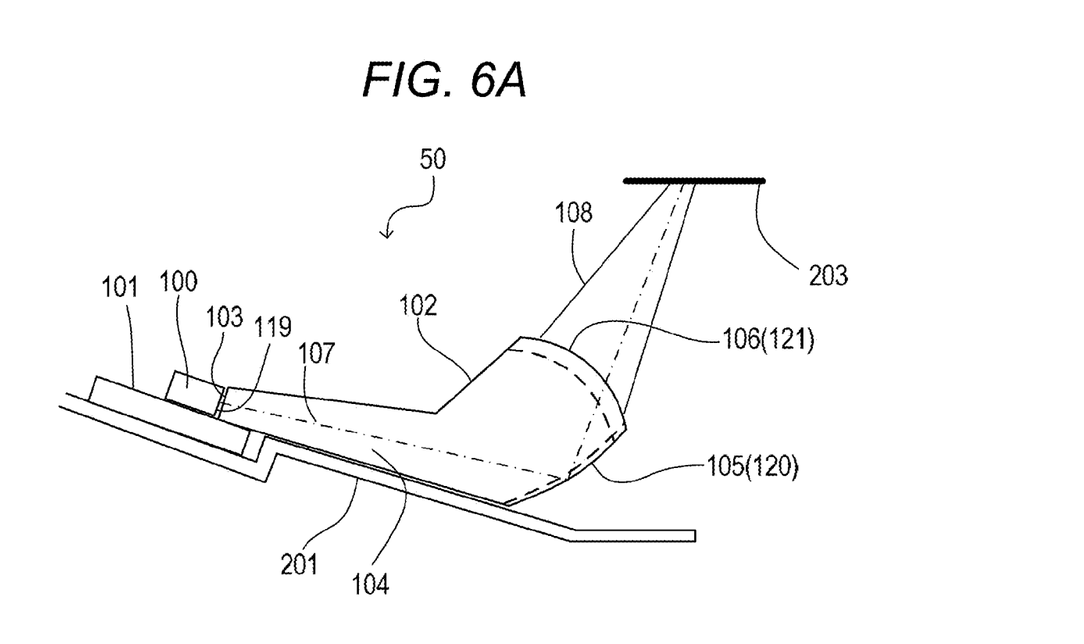
FIG. 6A and FIG. 6B are views for illustrating an illumination device according to a second embodiment.
Figure 6B:
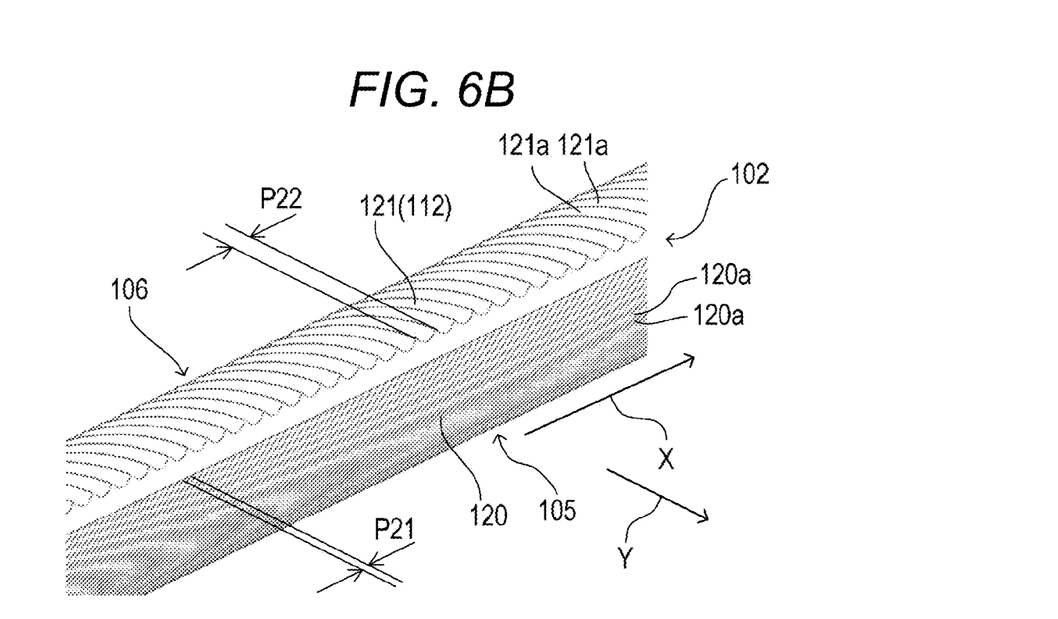

FIG. 6A and FIG. 6B are views for illustrating the illumination device 50 according to the second embodiment. FIG. 6A is a cross-sectional view for illustrating a sub-scanning cross-section of the illumination device 50. FIG. 6B is a partially enlarged view of the deflection surface 105 and the emission surface 106 of the light guide 102. A plurality of curved optical surfaces 120a and 121a are formed on the deflection surface 105 and the emission surface 106 side by side in the longitudinal direction of the light guide 102 (main scanning direction X). According to the second embodiment, the curved optical surfaces 120a and 121a are concave toric surfaces. The concave toric surfaces 120a and 121a have power in the longitudinal direction of the light guide 102 (main scanning direction X) and the sub-scanning direction Y orthogonal to the longitudinal direction X. However, the concave toric surfaces 120a and 121a may not necessarily have power in the longitudinal direction X of the light guide 102 and the sub-scanning direction Y orthogonal to the longitudinal direction X. The concave toric surfaces 120a and 121a may have power in a direction inclined with respect to the longitudinal direction X and a direction inclined with respect to a direction orthogonal to the longitudinal direction X. In other words, the longitudinal direction of each of the concave toric surfaces 120a and 121a may be a direction perpendicular to the longitudinal direction X of the light guide 102 or be inclined with respect to the longitudinal direction X of the light guide 102. Further, each of the concave toric surfaces 120a and 121a may be linearly formed in the longitudinal direction of each of the concave toric surfaces 120a and 121a or be formed so as to be curved in the longitudinal direction of each of the concave toric surfaces 120a and 121a.

On the deflection surface 105 of the light guide 102, there is formed a first toric surface array (first curved optical surface array) 120 in which the plurality of concave toric surfaces (first curved optical surfaces) 120a are arranged side by side at equal intervals at a first pitch P21 in the longitudinal direction X of the light guide 102. The first pitch P21 corresponds to a width of the concave toric surface 120a. According to the embodiment, the plurality of concave toric surfaces 120a are formed side by side without gaps between the adjacent concave toric surfaces 120a. However, slight gaps (non-toric surface) may exist between the adjacent concave toric surfaces 120a. The first toric surface array 120 serves as a secondary light source configured to deflect the light beam 107 propagating in the light guide portion 104 upward and to diffuse the light beam 107 in the longitudinal direction X of the light guide 102. The first toric surface array 120 converts the light beam 107 into a diffused light beam in the longitudinal direction X of the light guide 102, thus reducing the unevenness due to light emitting points that may occur depending on the array intervals of the light emitting elements 100.

On the emission surface 106 of the light guide 102, there is formed a second toric surface array (second curved optical surface array) 121 in which the plurality of concave toric surfaces (second curved optical surfaces) 121a are arranged side by side at equal intervals at a second pitch P22 in the longitudinal direction X of the light guide 102. The second pitch P22 corresponds to a width of the concave toric surface 121a. According to the embodiment, the plurality of concave toric surfaces 121a are formed side by side without gaps between the adjacent concave toric surfaces 121a. However, slight gaps (non-toric surface) may exist between the adjacent concave toric surfaces 121a. The second toric surface array 121 serves as a secondary light source configured to diffuse the emission light beam 108, which is emitted from the emission surface 106 of the light guide 102, in the longitudinal direction X of the light guide 102. The second toric surface array 121 converts the emission light beam 108 into a diffused light beam in the longitudinal direction X of the light guide 102, thus further reducing the unevenness due to light emitting points that may occur depending on the array intervals of the light emitting elements 100.

As in the first embodiment, the emission surface 106 on which the second toric surface array 121 is formed has the optical diffusion structure 112 configured to further diffuse the emission light beam 108 by scattering the light beam 107 passing therethrough. According to the embodiment, the optical diffusion structure 112 includes a texture (wrinkle pattern) formed on the plurality of concave toric surfaces 121a. The optical diffusion structure 112 formed on the second toric surface array 121 reduces the unevenness due to pitch bright points that may be caused by the second pitch P22 of the plurality of concave toric surfaces 121a of the second toric surface array 121. Surface texturing is the same as that in the first embodiment and its description is omitted.

As in the first embodiment, according to the second embodiment, as illustrated in FIG. 6B, the second pitch P22 of the plurality of toric surfaces 121a of the second toric surface array 121 is set to be larger than the first pitch P21 of the toric surfaces 120a of the first toric surface array 120 (P21<P22). The number of peaks and troughs of the mold 115 configured to form the second toric surface array 121, namely, the number of groove portions can be thus reduced. Further, the width of the groove portions can be increased. Sand grains in sandblasting are less liable to enter the groove portions of the mold 115. A large number of groove portions in the mold 115 and a decrease in the width of the groove portions resulting therefrom leads to inadequate surface texturing of the groove portions. The inadequate surface texturing of the groove portions of the mold 115 reduces the effect of the optical diffusion structure 112, resulting in an inadequate effect of reducing the unevenness due to pitch bright points. In order to deal with this problem, according to the second embodiment, the second pitch P22 is set to be larger than the first pitch P21 to reduce the number of the groove portions of the mold 115 while increasing the width of the groove portions. Therefore, the surface texturing of the mold 115 can be performed easily and adequately.

According to the second embodiment, the unevenness due to light emitting points that may be caused by the plurality of light emitting elements 100 and the unevenness due to pitch bright points that may be caused by the plurality of toric surfaces 120a and 121a can be effectively reduced, thereby being capable of reducing the uneven illuminance on the surface of the original 203.

According to the embodiment, the second toric surface array 121 is subjected to the surface texturing. However, the second toric surface array 121 may not have the optical diffusion structure 112 through the surface texturing. Also in this case, the uneven illuminance can be reduced by the two toric surface arrays 120 and 121.

According to the embodiment, the second pitch P22 of the plurality of toric surfaces 121a of the second toric surface array 121 is set to be larger than the first pitch P21 of the toric surfaces 120a of the first toric surface array 120 (P21<P22). However, when the second pitch P22 is set to a value suitable for the surface texturing, the first pitch P21 may be equal to the second pitch P22.

Third Embodiment

Next, a third embodiment will be described. In the third embodiment, the same components as those of the first embodiment are denoted by the same reference symbols and their description is omitted. An image reading apparatus, an optical unit, and an illumination device according to the third embodiment are the same as those according to the first embodiment and their description is omitted. A light guide according to the third embodiment will be described below.

(Light Guide)

Figure 7A:
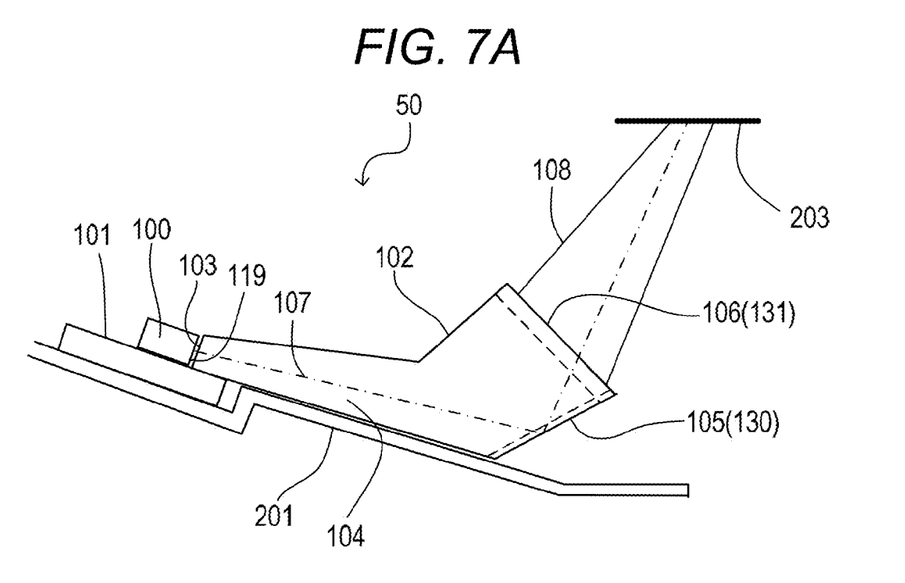
FIG. 7A and FIG. 7B are views for illustrating an illumination device according to a third embodiment.
Figure 7B:
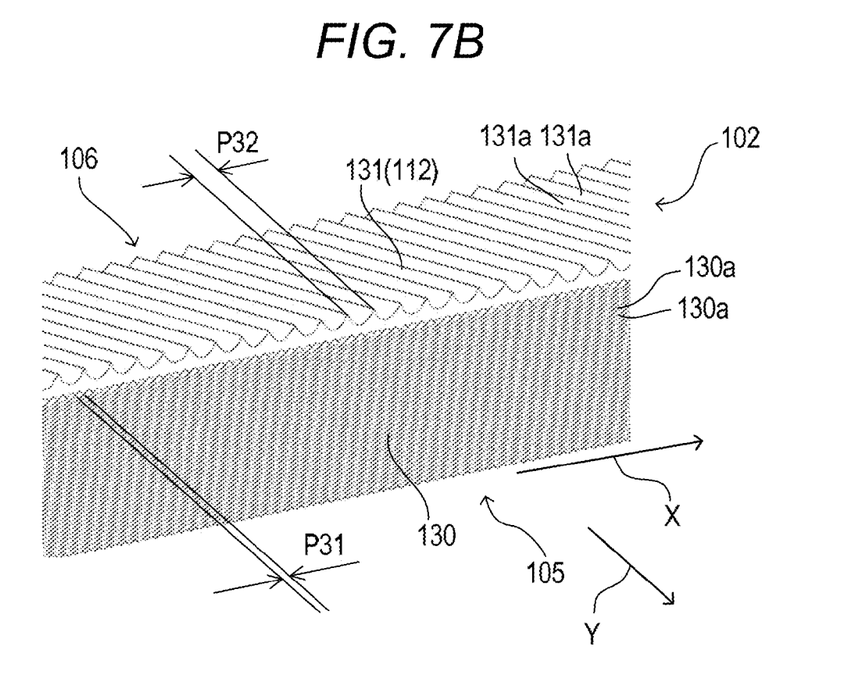

FIG. 7A and FIG. 7B are views for illustrating the illumination device 50 according to the third embodiment. FIG. 7A is a cross-sectional view for illustrating a sub-scanning cross-section of the illumination device 50. FIG. 7B is a partially enlarged view of the deflection surface 105 and the emission surface 106 of the light guide 102. A plurality of curved optical surfaces 130a and 131a are formed on the deflection surface 105 and the emission surface 106 side by side in the longitudinal direction of the light guide 102 (main scanning direction X). According to the third embodiment, the curved optical surfaces 130a and 131a are concave cylindrical surfaces obtained by making straight the generatrices of the concave toric surfaces 120a and 121a according to the second embodiment. The concave cylindrical surfaces 130a and 131a have power only in the longitudinal direction of the light guide 102 (main scanning direction X) and do not have power in the sub-scanning direction Y orthogonal to the longitudinal direction X. However, the concave cylindrical surfaces 130a and 131a may have power only in a direction inclined with respect to the longitudinal direction X. In other words, the longitudinal direction of each of the concave cylindrical surfaces 130a and 131a may be a direction perpendicular to the longitudinal direction X of the light guide 102 or be inclined with respect to the longitudinal direction X of the light guide 102.

On the deflection surface 105 of the light guide 102, there is formed a first cylindrical surface array (first curved optical surface array) 130 in which the plurality of concave cylindrical surfaces (first curved optical surfaces) 130a are arranged side by side at equal intervals at a first pitch P31 in the longitudinal direction X of the light guide 102. The first pitch P31 corresponds to a width of the concave cylindrical surface 130a. According to the embodiment, the plurality of concave cylindrical surfaces 130a are formed side by side without gaps between the adjacent concave cylindrical surfaces 130a. However, slight gaps (non-cylindrical surface) may exist between the adjacent concave cylindrical surfaces 130a. The first cylindrical surface array 130 serves as a secondary light source configured to deflect the light beam 107 propagating in the light guide portion 104 upward and to diffuse the light beam 107 in the longitudinal direction X of the light guide 102. The first cylindrical surface array 130 converts the light beam 107 into a diffused light beam in the longitudinal direction X of the light guide 102, thus reducing the unevenness due to light emitting points that may occur depending on the array intervals of the light emitting elements 100.

On the emission surface 106 of the light guide 102, there is formed a second cylindrical surface array (second curved optical surface array) 131 in which the plurality of concave cylindrical surfaces (second curved optical surfaces) 131a are arranged side by side at equal intervals at a second pitch P32 in the longitudinal direction X of the light guide 102.

The second pitch P32 corresponds to a width of the concave cylindrical surface 131a. According to the embodiment, the plurality of concave cylindrical surfaces 131a are formed side by side without gaps between the adjacent concave cylindrical surfaces 131a. However, slight gaps (non-cylindrical surface) may exist between the adjacent concave cylindrical surfaces 131a. The second cylindrical surface array 131 serves as a secondary light source configured to diffuse the emission light beam 108, which is emitted from the emission surface 106 of the light guide 102, in the longitudinal direction X of the light guide 102. The second cylindrical surface array 131 converts the emission light beam 108 into a diffused light beam in the longitudinal direction X of the light guide 102, thus further reducing the unevenness due to light emitting points that may occur depending on the array intervals of the light emitting elements 100.

As in the first embodiment, the emission surface 106 on which the second cylindrical surface array 131 is formed has the optical diffusion structure 112 for further diffusing the emission light beam 108 by scattering the light beam 107 passing therethrough. According to the embodiment, the optical diffusion structure 112 includes a texture (wrinkle pattern) formed on the plurality of concave cylindrical surfaces 131a. The optical diffusion structure 112 formed on the second cylindrical surface array 131 reduces the unevenness due to pitch bright points that may occur depending on the second pitch P32 of the plurality of concave cylindrical surfaces 131a of the second cylindrical surface array 131. Surface texturing is the same as that in the first embodiment and its description is omitted.

As illustrated in FIG. 7B, the second pitch P32 of the plurality of cylindrical surfaces 131a of the second cylindrical surface array 131 is set to be larger than the first pitch P31 of the cylindrical surfaces 130a of the first cylindrical surface array 130 (P31<P32). The number of peaks and troughs of the mold 115 configured to form the second cylindrical surface array 131, namely, the number of groove portions can be thus reduced. Therefore, as in the second embodiment, the surface texturing of the mold 115 can be performed easily and adequately.

According to the third embodiment, the unevenness due to light emitting points that may be caused by the plurality of light emitting elements 100 and the unevenness due to pitch bright points that may be caused by the plurality of cylindrical surfaces 130a and 131a can be effectively reduced, thereby being capable of reducing the uneven illuminance on the surface of the original 203.

According to the embodiment, the second cylindrical surface array 131 is subjected to the surface texturing. However, the second cylindrical surface array 131 may not have the optical diffusion structure 112 through the surface texturing. Also in this case, the uneven illuminance can be reduced by the two cylindrical surface arrays 130 and 131.

According to the embodiment, the second pitch P32 of the plurality of cylindrical surfaces 131a of the second cylindrical surface array 131 is set to be larger than the first pitch P31 of the cylindrical surfaces 130a of the first cylindrical surface array 130 (P31<P32). However, when the second pitch P32 is set to a value suitable for the surface texturing, the first pitch P31 may be equal to the second pitch P32.

According to the embodiment, the concave cylindrical surfaces 130a and 131a are formed on the deflection surface 105 and the emission surface 106 of the light guide 102 as curved optical surfaces. However, convex cylindrical surfaces may be used as the curved optical surfaces. The plurality of convex cylindrical surfaces may be arranged side by side in the longitudinal direction of the light guide 102 (main scanning direction X) on the deflection surface 105 and the emission surface 106 of the light guide 102.

Further, a concave cylindrical surface array may be formed on one of the deflection surface 105 and the emission surface 106 and a convex cylindrical surface array may be formed on the other. Alternatively, a concave toric surface array may be formed on one of the deflection surface 105 and the emission surface 106 and a convex toric surface array may be applied to the other. Further, a concave or convex toric surface array may be formed on one of the deflection surface 105 and the emission surface 106 and a concave or convex cylindrical surface array may be formed on the other.

According to the above-mentioned first to third embodiments, the uneven illuminance on the original surface illuminated by the illumination device so as to read an image can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-049272, filed Mar. 12, 2015, which is hereby incorporated by reference herein in its entirety.

What is claimed is:

1. An image reading apparatus configured to read an image of an original, the image reading apparatus comprising:
    an illumination device configured to illuminate the original; and
    a solid-state image sensor configured to receive a reflected light from the original and convert the reflected light into an image signal,
    wherein the illumination device includes:
        a plurality of light emitting elements; and
        a light guide configured to guide light emitted from the plurality of light emitting elements toward the original,
    wherein the light guide includes:
        an incident surface which the light emitted from the plurality of light emitting elements enters;
        a light guide portion through which the light entering the incident surface is transmitted to a deflection surface while repeating total reflection;
        the deflection surface configured to deflect the light emitted from the plurality of light emitting elements to direct the light toward the original; and
        an emission surface configured to emit the light deflected by the deflection surface toward the original,
    wherein a plurality of first curved optical surfaces are arranged on the deflection surface at a first pitch in a longitudinal direction of the light guide,
    wherein a plurality of second curved optical surfaces are arranged on the emission surface at a second pitch in the longitudinal direction of the light guide, the second curved optical surfaces being concave surfaces,
    wherein the second pitch is larger than the first pitch, and
    wherein a plurality of curved optical surfaces provided side by side are not provided on an outer surface constituting the light guide portion.

2. The image reading apparatus according to claim 1, wherein the plurality of first curved optical surfaces include convex toric surfaces, concave toric surfaces, convex cylindrical surfaces, or concave cylindrical surfaces, and wherein the plurality of second curved optical surfaces include concave toric surfaces, or concave cylindrical surfaces.

3. The image reading apparatus according to claim 1, wherein each of the plurality of first and second curved optical surfaces extends more in a direction perpendicular to the longitudinal direction of the light guide than in a direction parallel to the longitudinal direction of the light guide.

4. The image reading apparatus according to claim 1, wherein both of the first plurality of curved optical surfaces and the second plurality of curved optical surfaces are concave surfaces.

5. The image reading apparatus according to claim 4, wherein the plurality of first curved optical surfaces include concave toric surfaces, or concave cylindrical surfaces, and wherein the plurality of second curved optical surfaces include concave toric surfaces, or concave cylindrical surfaces.

6. The image reading apparatus according to claim 1, wherein at least one of the first plurality of curved optical surfaces and the second plurality of curved optical surfaces extends in a direction inclined with respect to the longitudinal direction of the light guide and also extends in a direction inclined with respect to a direction orthogonal to the longitudinal direction of the light guide.

7. The image reading apparatus according to claim 1, wherein a texture is formed on the plurality of second curved optical surfaces.

8. The image reading apparatus according to claim 7, wherein the texture provides the emission surface with an optical diffusion structure.

9. The image reading apparatus according to claim 7, wherein the texture is a fine concavity-and-convexity pattern.

10. The image reading apparatus according to claim 7, wherein the texture is formed by irregular micromachining on the plurality of second curved optical surfaces.

11. The image reading apparatus according to claim 7, wherein the texture is formed on the plurality of second curved optical surfaces by using a mold, on a surface of which a fine concavity-and-convexity pattern is formed by etching or sandblasting.

12. The image reading apparatus according to claim 7, wherein the texture formed on the plurality of second curved optical surfaces is coarse.

13. The image reading apparatus according to claim 1, wherein a texture is formed on the plurality of second curved optical surfaces, and a texture is not formed on the plurality of first curved optical surfaces.

* * * * *